(12) United States Patent
Taivalsaari

(10) Patent No.: US 6,307,562 B1
(45) Date of Patent: Oct. 23, 2001

(54) GRAPHICAL INTERFACE WITH EVENT HORIZON

(75) Inventor: Antero K. P. Taivalsaari, Cupertino, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/270,260

(22) Filed: Mar. 15, 1999

(51) Int. Cl.[7] .................................................. G06T 17/00
(52) U.S. Cl. ........................................... 345/473; 345/433
(58) Field of Search ..................................... 345/473, 474, 345/433, 434, 435, 436

(56) References Cited

U.S. PATENT DOCUMENTS

| | | | |
|---|---|---|---|
| 5,519,618 | * 5/1996 | Kastner et al. ..................... | 364/439 |
| 5,608,909 | * 3/1997 | Atkinson et al. ..................... | 395/703 |
| 5,613,124 | * 3/1997 | Atkinson et al. ..................... | 345/433 |
| 5,861,885 | * 1/1999 | Stransnick et al. ................... | 345/355 |
| 6,064,406 | * 5/2000 | Atkinson et al. ..................... | 345/515 |

OTHER PUBLICATIONS

John Lamping and Ramana Rao; "Laying Out and Visualizing Large Trees Using a Hyperbolic Space"; UIST'94, Marina del Ray, CA; Nov. 2–4, 1994; pp. 13–14.

Joseph M. Ballay; "Designing Workscape: An Interdisciplinary Experience"; Human Factors in Computing Systems CHI '94; Boston, MA; Apr. 24–28, 1994; pp. 10–15.

Randall B. Smith, Ronald Hixon, and Bernard Horan; "Supporting Flexible Roles in a Shared Space"; Computer Supported Communications Work '98 (CSCW'98) Conference Proceedings; Seattle, WA; Nov. 14–18, 1998; pp. 1–10.

* cited by examiner

*Primary Examiner*—Cliff N. Vo
(74) *Attorney, Agent, or Firm*—Park, Vaughan & Fleming LLP

(57) ABSTRACT

One embodiment of the present invention provides a system for viewing a plurality of objects on a graphical display. The graphical display includes space for displaying objects and a sink that contains objects that are not visible on the graphical display. The system operates by receiving a command from a user of the graphical display. When the command is a compress command, if an object is inside the sink, the system moves the object a level deeper into the sink. If the object is located outside the sink on the graphical display, the system moves the object closer in a radial direction towards the sink. If the object moves very close to the sink, the object leaves the graphical display and enters the sink. When the command is an expand command, if the object is located inside the sink, the system moves the object a level higher in the sink. If the object is already at a highest level of the sink, the object leaves the sink and enters the graphical display at a location near the sink. If the object is located outside the sink on the graphical display, the system moves the object in a radial direction away from the sink. Objects that move past the boundaries of a graphical display are no longer visible, but may become visible again after subsequent compress operations.

25 Claims, 5 Drawing Sheets

GRAPHICAL INTERFACE WITH EVENT HORIZON

BACKGROUND

1. Field of the Invention

The present invention relates to graphical user interfaces for computer systems. More particularly, the present invention relates to a method and an apparatus for viewing a group of objects on a graphical display.

2. Related Art

One of the scarcest resources in today's computing devices is screen space. Even though the processing power and storage capacity of computing devices has increased by several orders of magnitude during the past twenty years, the average computer screen size has barely doubled. Although the resolution, clarity, and the overall quality of the displays has improved substantially, the actual size of the work area remains relatively limited. Screen space limitations are particularly apparent in the emerging pocket-sized computing devices and personal organizers, such as the palm connected organizer produced by the 3COM Corporation of Sunnyvale, Calif. These pocket-sized computing devices often have display sizes that are less than a few hundred or a few thousand square pixels.

At present, the most commonly used user interface paradigm for computing devices is the windows-icons-desktop-folders metaphor prevalent on computers such as the Macintosh, or personal computers running the Microsoft Windows operating system. Under this paradigm, the screen of a computer system simulates an office desktop that contains various objects. These objects are represented as graphical "icons" that can be opened as "windows" on the screen. Under this paradigm, a user can create an unlimited number of overlapping windows, and the size of these windows can be adjusted dynamically. The user can also hierarchically create and manipulate "folders" that reflect how the information is organized on the computer system's storage devices.

One of the main problems of the traditional windows-icons-desktop-folders metaphor is that it does not work well for large amounts of information because finding and organizing large numbers of windows and objects becomes very tedious. Also, the use of multiple windows is not feasible in computing devices with limited screen area.

In order to accommodate large amounts of data, some researchers have proposed using an "unlimited" desktop. (For example, see the Kansas user interface of the Self 4.0 programming environment described in "Supporting Flexible Roles in a Shared Space," Smith, et al., Computer Supported Collaborative Work '98 Conference Proceedings, Seattle Wash. Nov. 14–18, 1995). This type of user interface can be used to store and manipulate a virtually unlimited number of objects without the use of multiple windows. Objects in different parts of the unlimited space can be viewed using panning functions to navigate up/down and left/right through the unlimited space.

Unfortunately, experience has shown that navigating through a large two-dimensional space is not always easy. Locating a particular object may require a user to exhaustively pan and zoom through the space. To facilitate finding objects, additional tools (such as "radar" views) may be needed to help the user. However, the use of such tools may not be practical in small computing devices with limited screen size.

Some user interfaces have tried to break away from the limitations of flat, two-dimensional displays through the use of zooming and three-dimensional graphics. For instance, the Pad++ environment allows the user to "push" and "pull" objects farther and closer by using the zooming operations in conjunction with the conventional panning operations. (See "Pad++: A Zooming Graphical User Interface for Exploring Alternate Interface Physics," Bederson, et al., User Interface and Software Technology Conference Proceedings, pp. 17–26. Marina Del Rey, Nov. 2–4, 1994.) Unfortunately, this paradigm tends to make user interfaces complicated, because current pointing devices such as the mouse do not readily support object manipulation in three dimensions. Furthermore, most small computing devices do not have the necessary graphics support (e.g., text font scaling operations) or do not have adequate computing power to support the computationally demanding zooming and three-dimensional graphics operations.

SUMMARY

One embodiment of the present invention provides a system for viewing a plurality of objects on a graphical display. The graphical display includes space for displaying objects and a sink that contains objects that are not visible on the graphical display. The system operates by receiving a command from a user of the graphical display. When the command is a compress command, if an object is inside the sink, the system moves the object a level deeper into the sink. If the object is located outside the sink on the graphical display, the system moves the object closer in a radial direction towards the sink. If the object moves very close to the sink, the object leaves the graphical display and enters the sink. When the command is an expand command, if the object is located inside the sink, the system moves the object a level higher in the sink. If the object is already at a highest level of the sink, the object leaves the sink and enters the graphical display at a location near the sink. If the object is located outside the sink on the graphical display, the system moves the object in a radial direction away from the sink. Objects that move past the boundaries of a graphical display are no longer visible, but may become visible again after subsequent compress operations.

Thus, one embodiment of the present invention provides an unlimited two-dimensional space for storing objects typically found on the computer screens, such as icons, pictures, graphical elements and text. A user can move objects about the screen in traditional fashion by using a mouse, pen or other pointing device. In the middle of the screen there is a small area known as a sink or an event horizon. The sink serves as an unlimited container in which objects are stored when the display is "compressed."

A simple user interface navigation operation, known as the "expand/compress" function, is available to the user. This function is operated by using two simple buttons, such as the up and down buttons of a Palm connected organizer, or a simple rocker switch. When the display is "compressed," objects on the screen move closer in a radial direction towards the sink, which is typically located at the center of the screen. Objects that come close enough to the sink are "sucked in" the sink and disappear from the screen. This paradigm suggests the term "event horizon," because the sink operates like a black hole.

When the display is "expanded," objects on the screen move away in a radial direction from the sink. At the same time, the sink releases the objects it contains in the original order the objects were previously sucked into the sink. This makes the objects visible again and restores the original view.

During the "expand" operation, objects may move beyond the physical limits of the computer screen. This is perfectly normal: objects may later be brought back to the visible part of the screen by using the "compress" operation. In general, the expand/compress process is entirely reversible and repeatable. The compress operation allows a user to gradually pull complex, visual displays of information away from the screen altogether, and store them in the sink. Conversely, the expand operation restores the view as it was before compression.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may carry information across a communications network, such as the Internet.

Computer System

Figure 1:
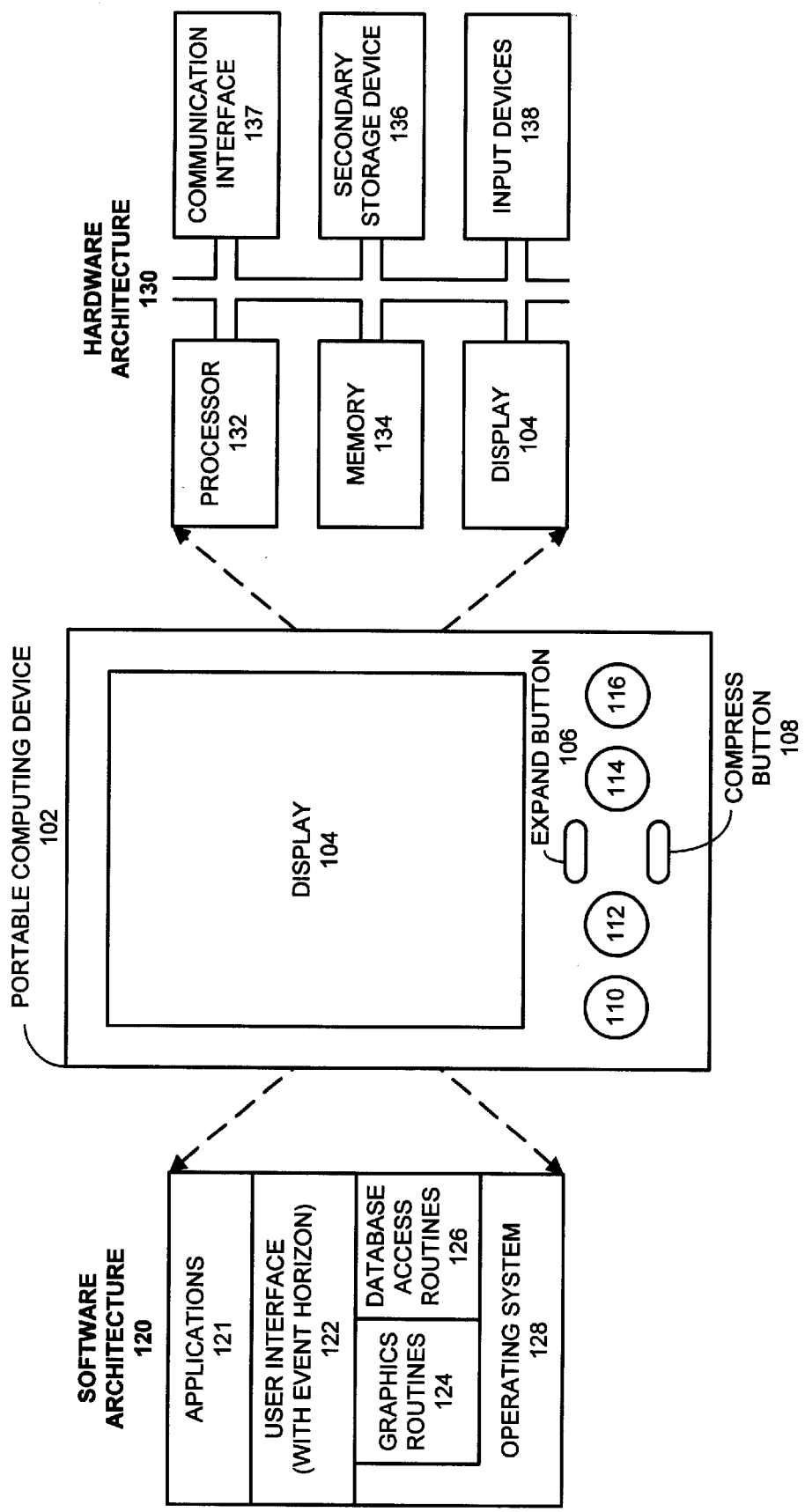
FIG. 1 illustrates the structure of a portable computing device in accordance with an embodiment of the present invention.

FIG. 1 illustrates the structure of a portable computing device 102 in accordance with an embodiment of the present invention. Portable computing device 102 may include any type of portable computing device with a graphical display, including a personal organizer such as a Palm connected organizer, a two-way pager, a cellular telephone and a mobile web browser. In general, the present invention is not limited to portable computing devices, and can operate on any type of computing device with a graphical display, portable or not. For example, the present invention may be used in a personal computer, a workstation or a mainframe computer system.

Portable computing device 102 includes a display 104 for outputting data to a user, and a plurality of buttons 106, 108, 110, 112, 114 and 116, for receiving input from the user. Display 104 may be any type of display device on a computer system, including a flat panel display, a LCD display or an active matrix display. Note that the screen area of display 104 is relatively small, and may include as little as a few hundred square pixels. Buttons 106, 108, 110, 112, 114 and 116 allow the user to navigate through data contained within portable computing device 102 and to display this data onto display 104. Button 106 is an "expand" button that activates an expand operation that expands a layout of objects on display 104. Button 106 is a "compress" button that activates a compress operation that compresses the layout of objects on display 104. Note that any button on a computing device can be configured to act as a "compress" button or an "expand" button. Also note that many other types of input devices can be used with the present invention, including a keyboard, a mouse and a touch-sensitive display 104.

Portable computing device 102 includes a software architecture 120 to support the user interface navigation capabilities related to the present invention. At the lowest level, this software architecture includes operating system 128, which supports the execution of applications on portable computing devices. In one embodiment of the present invention, operating system 128 includes the Palm OS that is contained within the Palm connected organizer. In another embodiment, operating system 128 includes the WINDOWS CE operating system distributed by the Microsoft Corporation of Redmond, Wash.

Alongside operating system 128 is graphics routines 124 and database access routines 126. Graphics routines 124 generally include any routines for facilitating the generation of images on display 104. Database access routines 126 generally include any routines that facilitate retrieval of data from within portable computing device 102, or from an external host coupled to portable computing device 102 through some type of communication channel.

User interface 122 resides on top of operating system 128, graphics routines 124 and database access routines 126. User interface 122 interacts with operating system 128, graphics routines 124 and database access routines 126 to implement a display including a sink (event horizon) in accordance with an embodiment of the present invention.

Finally applications 121 reside on top of user interface 122. Applications 121 may include any type of applications for portable computing device 102 that can be used in conjunction with user interface 122.

Portable computing device 102 includes hardware architecture 130. Hardware architecture 130 includes processor 132, memory 134, display 104, secondary storage device 136, input devices 138 and communication interface 137. These components are coupled together by bus 133. Processor 132 may be any type of computational engine for executing programs within portable computing device 102. This includes, but is not limited to, a microprocessor, a device controller, and a computational engine within an appliance. Memory 134 may include any type of random access memory for storing code and data for processor 132. Secondary storage device 136 may include any type of non-volatile storage device for storing code and data to for use by processor 132. This includes, but is not limited to, magnetic storage devices, such as a disk drive, and electronic storage devices, such as flash memory or battery backed up RAM. Display 104 (described above) may include any type of device for displaying images on a computer system. Input devices 138 may include any type of devices for inputting data into portable computing device 102. This includes buttons 106, 108, 110, 112, 114 and 116 illustrated in FIG. 1, as well as a keyboard, a mouse or a touch-sensitive display. Communication interface 137 may include any type of mechanism for communicating between portable computing device 102 and an external host. This may include a linkage to a computer network through electrical, infrared or radio signal communication pathways.

Compress and Expand Operations

Figure 2:
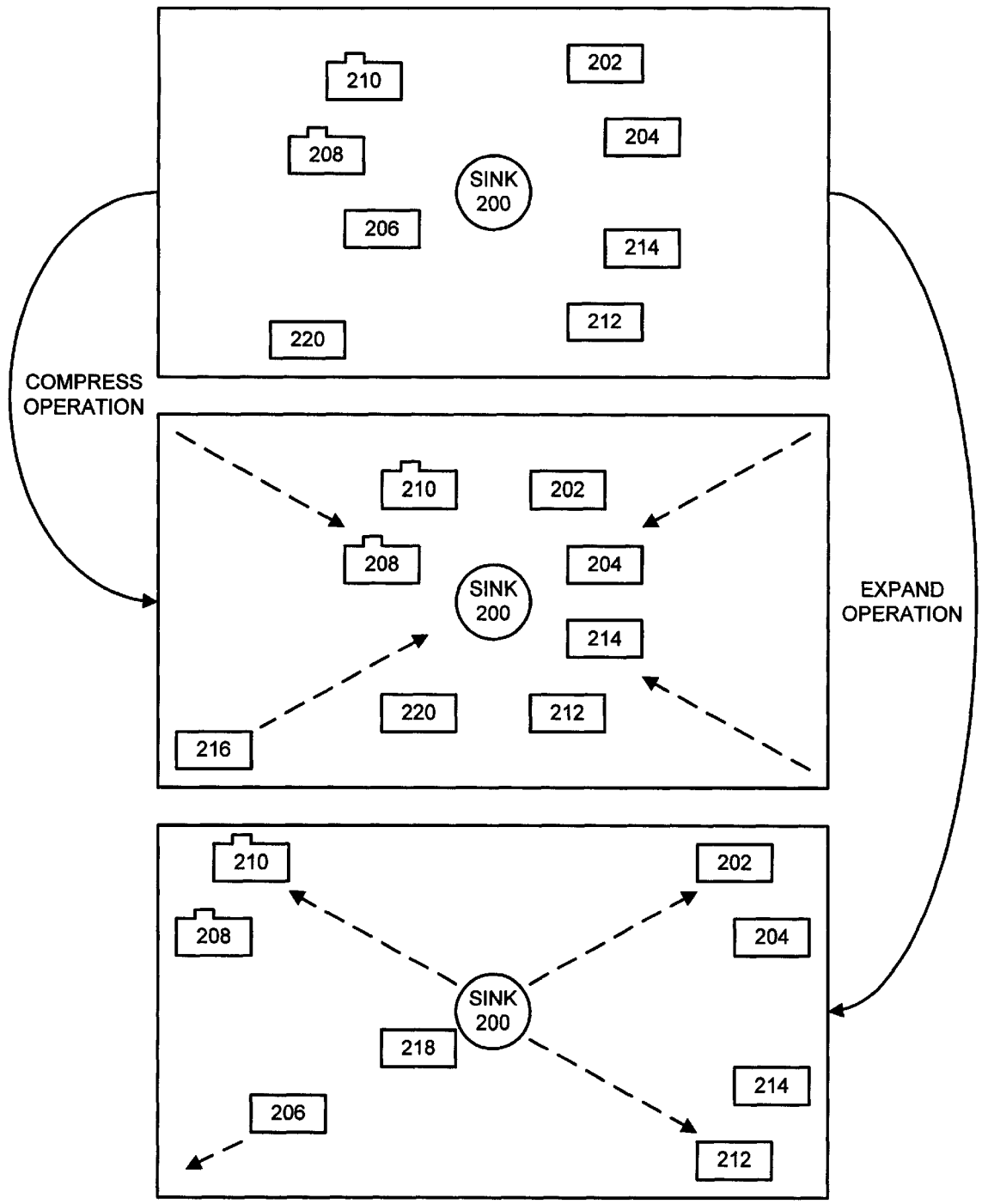
FIG. 2 illustrates compress and expand operations in accordance with an embodiment of the present invention.

FIG. 2 illustrates the results of a compress operation and an expand operation in accordance with an embodiment of the present invention. FIG. 2 includes three different diagrams of display 104. The top diagram of FIG. 2 illustrates an initial state of display 104 before a compress operation or an expand operation. The middle diagram of FIG. 2 illustrates the state of display 104 after a compress operation. The bottom diagram of FIG. 2 illustrates the state of display 104 after an expand operation.

Referring to the top diagram, display 104 includes a representation of a currently active sink 200, which is located near or at the center of display 104. Display 104 also includes a number of note objects 202, 204, 206, 212, 214 and 220 containing textual information. If a note object is selected, textual information inside the note object is displayed in a form that can be edited. Display 104 also includes representations of inactive sink objects 208 and 210 (which appear as folders). When one of these inactive sink objects 208 or 210 is selected, it becomes the currently active sink object.

Referring to the middle diagram, after a compress operation is initiated by pressing compress button 108 in FIG. 1, objects in display 104 move toward sink 200. Objects that move very close to sink 200 disappear into sink 200. For example, object 206, which starts out close to sink 200 in the top diagram disappears into sink 200 in the middle diagram. Some of the objects that were located outside of the borders of display 104 move closer to sink 200 and thereby become visible again within display 104. For example, object 216, which was outside of display 104 and was hence not visible in the top diagram, becomes visible in the middle diagram after the compress operation.

Referring the to the bottom diagram, after an expand operation is initiated by pressing expand button 106 in FIG. 1, objects in display 104 move away from sink 200. Some of these objects, which are located near borders of display 104, move out of the visual bounds of display 104. For example, object 220 moves off of display 104. Other objects that are located at the highest levels of sink 200 become visible on display 104 at a location near sink 200. For example, object 218, which was formerly contained within sink 200, leaves sink 200 after the expand operation and becomes visible on display 104 at a location near sink 200.

Object Types

Figure 3:
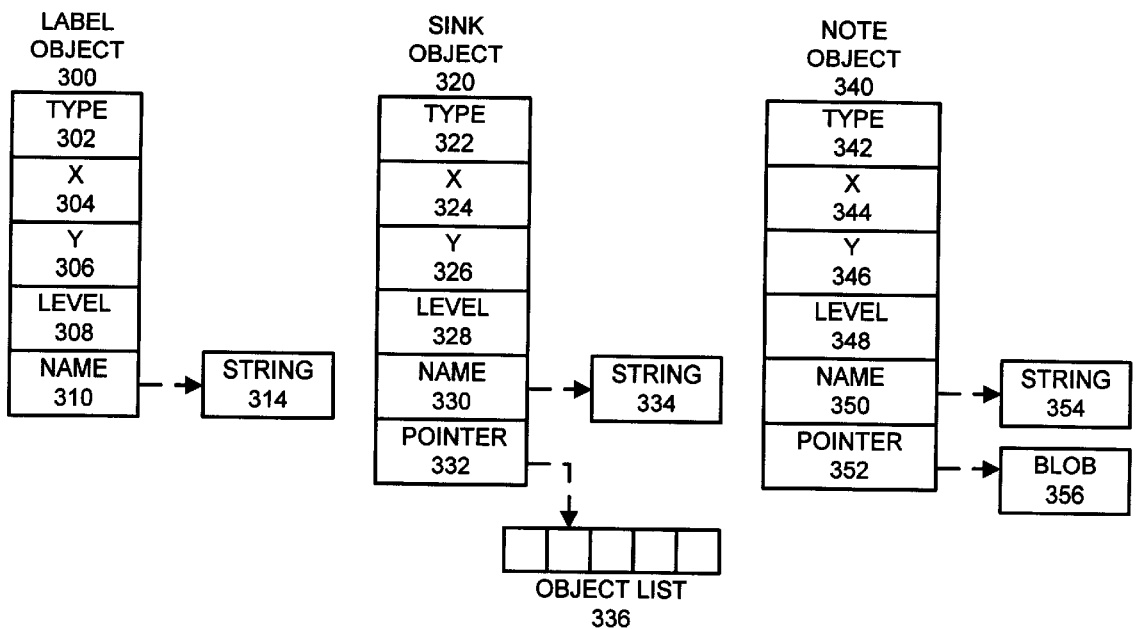
FIG. 3 illustrates various object types in accordance with an embodiment of the present invention.

FIG. 3 illustrates various object types in accordance with an embodiment of the present invention. The embodiment illustrated in FIG. 3 includes three types of objects: a label object 300, a sink object 320 and a note object 340. This embodiment additionally includes three primitives, including: string 314, object list 336 and binary large object (BLOB) 356.

A label object 300 is used for storing labels in the form of character strings. Label object 300 includes a type field 302 indicating the type of the object; this may include other types of identification information. It also includes an X coordinate 304 and a Y coordinate 306, which describe the object's position on display 104. If the object is located inside the sink, the X and Y coordinates represent the object's last position on the display before the object moved into the sink. Label object 300 additionally includes a level value 308, which indicates the depth of the object in the sink. An object that is not inside the sink has a zero level value. Label object 300 additionally includes a name field 310, which points to a character string containing the desired label.

A sink object 320 is used for storing a representation of a sink. Like label object 300, sink object 320 includes a type field 322, an X coordinate 324, a Y coordinate 326 and a level value 328. Sink object 320 additionally includes a name field 330, which points to a character string 334 containing the name of the sink object 320. Sink object 320 additionally contains a pointer 332 to an object list 336. Object list 336 is a list of pointers to the objects associated with sink object 320. For example, object list 336 may contain pointers to the label objects, sink objects and note objects associated with sink object 320.

A note object 340 is used to store textual data or other types of data. Like sink object 320 and label object 300, note object 340 includes a type field 342, an X coordinate 344, a Y coordinate 346, a level value 348 and a name field 350. Note object 340 additionally includes a pointer 352 to a BLOB 356 containing the textual data or other type of data associated with note object 340.

Object Organization

Figure 4:
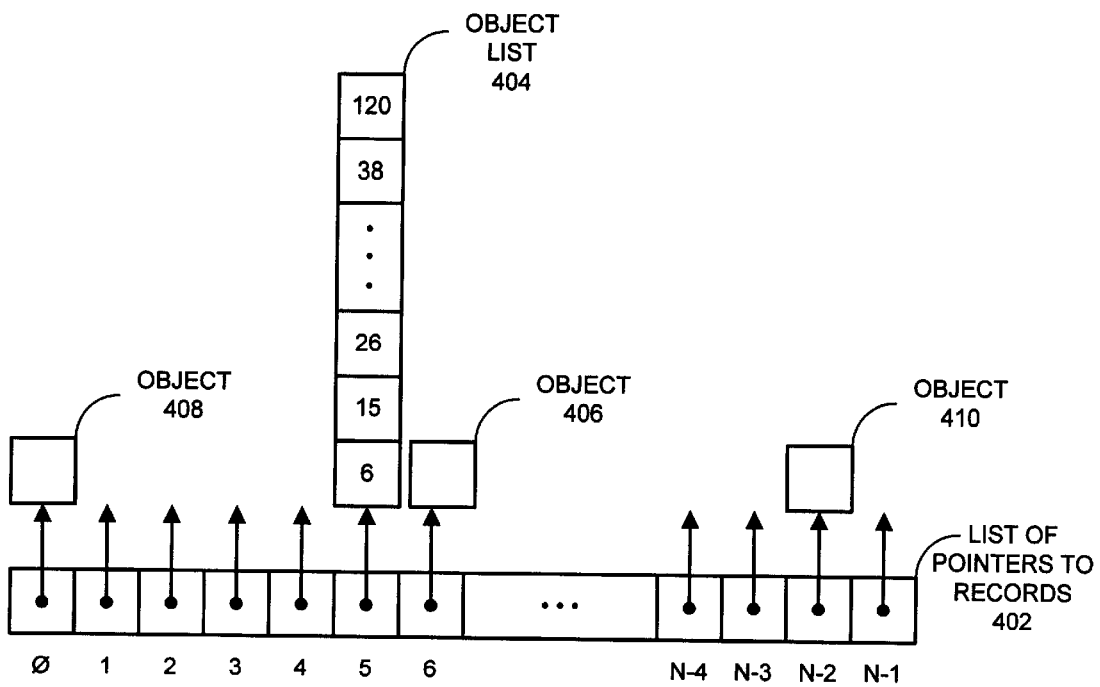
FIG. 4 illustrates how objects are organized in accordance with an embodiment of the present invention.

FIG. 4 illustrates how objects are organized in accordance with an embodiment of the present invention. Portable computing device 102 from FIG. 1 includes database access routines 126 to access a database of objects that is organized as illustrated in FIG. 4. This database includes a list of pointers to records 402. Each pointer in the list can point to an object, such as objects 408, 406, and 410 as well as primitives, such as object list 404.

Note that all objects in portable computing device 102 can therefore be referenced by an index into list of pointers to records 402. Hence, object list 404 contains indices to entries in list of pointers to records 402, not actual pointer values containing memory addresses.

Operation of Commands

Figure 5:
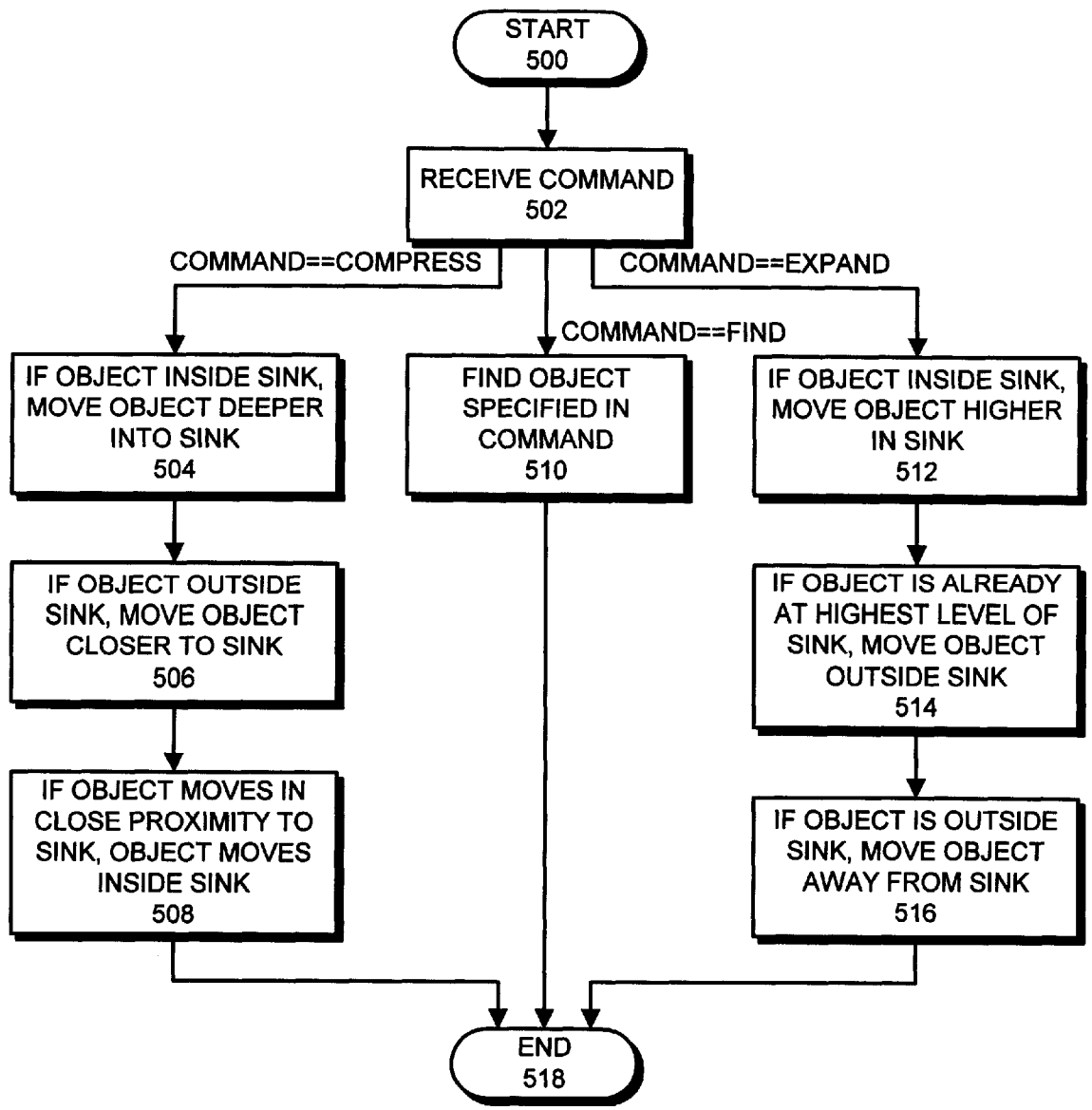
FIG. 5 is a flow chart illustrating how several commands operate in accordance with an embodiment of the present invention.

FIG. 5 is a flow chart illustrating how several user interface commands operate in accordance with an embodiment of the present invention. The system first receives a command from one of the buttons 106, 108, 110, 112, 114 and 116 on portable computing device 102 (step 502). If the command is a compress command, the system considers each object in the currently active sink and determines if the object is inside the sink by reading the level value for the object. If the level value is zero, the object is not inside the sink, otherwise the object is inside the sink. If the object is inside the sink, the system moves the object deeper into the sink by incrementing the level value for the object (step 504). If the object is outside the sink, the object is moved closer to the sink (step 506). This is accomplished by changing the X coordinate and the Y coordinate of the object so that object moves closer to the sink.

In one embodiment of the present invention, this movement is accomplished by subtracting or adding an X offset from the X coordinate and a Y offset from the Y coordinate, so that the object moves at a 45-degree angle toward the sink. This implementation is computationally efficient because it requires only simple addition and subtraction operations. In another embodiment, this movement is accomplished by moving the object closer to the sink along a line connecting the object to the sink. This embodiment tends to be more aesthetically pleasing than the 45-degree angle approach.

If the object moves within a close proximity of the sink (for example within a fixed number of pixels from the sink) the object moves inside the sink and disappears from the screen (step 508). The system does not explicitly erase the object from the screen. The routine that draws the object is merely modified so that it does not draw any objects with a level value that is greater than zero—indicating that the object is inside the sink.

If the command received in step 502 is a "find" command, the system finds an object that is specified in the command (step 510). This may involve scanning through the object list 336 associated with the sink, or scanning through list of pointers to records 402 in order to find the specified object.

If the command received in step 502 is an expand command, the system determines if the object is inside the sink. If the object is inside the sink, the system moves the object to a higher level of the skin by decrementing the level value of the object (step 512). If the object is already at the highest level of the sink, the decrement command causes the level value to become zero, and the system moves the object outside the sink so that it becomes visible on the display. Note that the object drawing routine will automatically check to see if the level value of the object is zero, and if so, will draw the object. Note that the X and Y coordinate values have not changed since the object entered the sink, so the object will reappear in the same position on the display that it occupied prior to entering the sink.

Finally, if the object is outside the sink, the system moves the object away from the sink (step 516). As with the compress operation, this may be accomplished by a simple 45-degree movement away from the sink, or alternatively by a movement along a line extending from the sink through the object to the edge of the display. If the object happens to move out of the boundaries of the display, it will no longer be visible in the display, but may return after subsequent compress operations move the object back into the visible region of the display.

Representation of the Sink Changing Form

Figure 6:
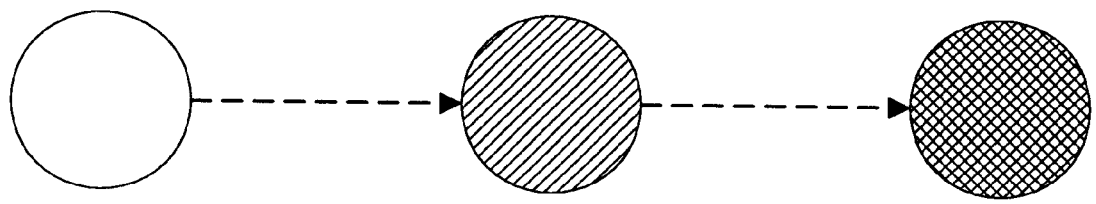
FIG. 6 illustrates how a representation of a sink visibly changes form according to an embodiment of the present invention.

FIG. 6 illustrates how a representation of a sink visibly changes form as more objects move into the sink according to an embodiment of the present invention. In this embodiment, the representation of the sink darkens as more objects move into the sink. In general, any other type of visible change of the representation of the sink can be used to indicate that more objects have moved into the sink, or that the sink has been further compressed or expanded.

Additional Variations

Many additional variations of the present invention are possible. In one embodiment of the present invention, the event horizon visibly changes when more objects enter the sink or when objects go deeper into the sink. The representation of the sink may visibly change by changing color or by changing form to indicate the presence of more objects in the sink, or to indicate the additional depth of objects in the sink.

Another embodiment of the present invention supports multiple sinks. These multiple sinks may be supported independently of each other, or may be stored hierarchically within each other. There may also be multiple sinks simultaneously on the display, possibly with overlapping objects. However, typically only one of the sinks is "active" at a given time.

Another embodiment of the present invention supports traditional navigation operations such as panning (up/down, left/right). This embodiment provides additional flexibility, but makes the user interface more complicated to use because more navigation buttons are required.

Another embodiment of the present invention provides accelerated compress and expand commands that more rapidly move data into and out of a sink. These accelerated compress and expand commands may be activated by holding down the compress and expand buttons, respectively, for a several seconds.

CONCLUSION

The present invention has a number of advantages compared to traditional user interface approaches: (1) The radial movement of objects ensures that the user sees all the objects stored in the sink while performing an expand operation to the completion—until the sink is empty. In traditional user interfaces the user has to scroll to several directions in order to see all of the objects. (2) It allows an unlimited amount of information to be visually organized and manipulated in a virtually large but physically limited space; the user can easily focus on certain parts of the information, and can compress all the information away from the screen when the space is needed for other things. (3) All of this is accomplished using one-dimensional navigation by means of expand and compress operations. The above-listed advantages are particularly important for small computing devices that do not have sufficient screen space to support multiple windows and additional navigation tools, or do not have the physical keys to support navigation in several different directions.

Furthermore, the distance of objects from the sink can serve as an implicit notion of time: the farther objects are from the sink, the more likely it is that they are "older" than the objects located closer the sink (assuming that the user makes more space by expanding the older objects away). Of course, it is also possible to store older objects at deeper levels in the sink. This ordering process can potentially be utilized by various tools (e.g., finding, sorting) that can automatically create different kinds of views that take advantage of the distance from the sink to indicate the relative order of objects.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

Example Implementation

The following code in Tables 1A, 1B and 1C presents an example implementation for the compress and expand commands written in the C programming language for the Palm connected organizer.

TABLE 1A

```
/* Copyright © 1999 SUN Microsystems, Inc. All Rights Reserved */
/*=====================================================================
 * FUNCTION:        shouldSuckIn (private)
 * DESCRIPTION:     Given two pairs of coordinates, check if the values
 *                  indicate if an object in the corresponding location
 *                  should be sucked in a sink.
 * PARAMETERS:      x, y (old), x, y (new)
 * RETURNS:         true if the object should go to sink, else false
 *====================================================================*/
int shouldSuckIn (int x, int y, int newX, int newY) {
        if (x >= 0 && newX < 0) return true;
        if (x < 0 && newX >= 0) return true;
        if (y >= 0 && newY < 0) return true;
        if (y < 0 && newY >= 0) return true;
        return false;
}
/*=====================================================================
 * FUNCTION:        findDeepestLevel (private)
 * DESCRIPTION:     Find the object that is currently "deepest" in the
 *                  sink, i.e., has the highest level.
 * PARAMETERS:      sinkNr
 * RETURNS:         the level value of the deepest object
 *====================================================================*/
int findDeepestLevel (int sinkNr) {
        int length = countObjects(sinkNr);
        int deepest = 0;
        for (int i = 1; i <= length; i++) {
                int object = getObjectInSink (sinkNr, i);
                if (object) {
                        int level = getObjectLevel (object);
                        if (level > deepest) deepest = level;
                }
        }
        return deepest;
}
/*=====================================================================
 * FUNCTION:        findShallowestLevel (private)
 * DESCRIPTION:     Find the object that is currently "shallowest" in the
 *                  sink, i.e., has the lowest level. Usually the value is
 *                  zero, i.e., the object is not in the sink.
 * PARAMETERS:      sinkNr
 * RETURNS:         the level value of the shallowest object
 *====================================================================*/
int findShallowestLevel(int sinkNr) {
        int length = countObjects(sinkNr);
        int shallowest = MAXINT;
        for (int i = 1; i <= length; i++) {
                int object = getObjectInSink (sinkNr, i);
                if (object) {
                        int level = getObjectLevel (object);
                        if(level < shallowest) shallowest = level;
                }
        }
        return shallowest;
}
```

TABLE 1B

```
/* Copyright © 1999 SUN Microsystems, Inc. All Rights Reserved */
/*=====================================================================
 * FUNCTION:        compressObject (private)
 * DESCRIPTION:     Move the object closer to the sink, sucking it in
 *                  if necessary.
 * PARAMETERS:      object number
 * RETURNS:         true if the objects has been sucked in, false if
 *                  the object is still outside the sink or was already
 *                  earlier in the sink.
 *====================================================================*/
int compressobject (int object) {
        int level = getObjectLevel (object);
        int stateChanged = false;
        //If the object is already in the sink,
        //increment the level ("pack it in deeper")
```

TABLE 1B-continued

```
            if (level) incrementLevel(object);
            else {
                    // The object is not in the sink => change coordinates
                    int x = getObjectX (object) - ABSOLUTE_MIDDLE_X;
                    int y = ABSOLUTE_MIDDLE_Y - getObjectY(object);
                    int newX; int newY;
                    if (x >= 0)
                                    newX = x - DEFAULTCOMPRESSRATIO;
                            else    newX = x + DEFAULTCOMPRESSRATIO;
                    if (y >= 0)
                                    newY = y - DEFAULTCOMPRESSRATIO;
                            else    newY =y + DEFAULTCOMPRESSRATIO;
                    //Check if the new coordinates indicate that the
                    //object should be sucked in the sink
                    if (shouldSuckIn (x, y, newX, newY)) {
                            incrementLevel (object);
                            stateChanged = true;
                    }
                    else setObjectXY(object, newX + ABSOLUTE_MIDDLE_X,
                            ABSOLUTE_MIDDLE_Y - n
            }
     return stateChanged;
}
/*=====================================================================
    * FUNCTION:               expandobject (private)
    * DESCRIPTION:            Move the object farther from the sink.
    * PARAMETERS:             object number
    * RETURNS:                        true if the objects has been thrown out from the sink,
    *                                 false if the object is still inside the sink or
    *                                 was already earlier outside the sink.
    *=====================================================================*/
int expandObject (int object) {
            int level = getObjectLevel (object);
            int stateChanged = (level == 1) ? true : false;
            // If the object is inside the sink, decrement level
            // (do_not_change coordinates)
            if (level) decrementLevel (object);
            else {
                    // The object is not in the sink => change coordinates
                    int x = getObjectX (object) - ABSOLUTE_MIDDLE_X;
                    int y = ABSOLUTE MIDDLE Y - getObjectY(object);
```

TABLE 1C

```
                    // When expanding, ensure that we don't overflow
                    // the coordinate space range
                    if (x >= 0) {
                            if (x + DEFAULTCOMPRESSRATIO < MAXINT - DEFAULTCOMPRESSRATIO)
                                    x += DEFAULTCOMPRESSRATIO;
                            else x -= DEFAULTCOMPRESSRATIO;
                    }
                    if (y >= 0) {
                            if (y + DEFAULTCOMPRESSRATIO < MAXINT - DEFAULTCOMPRESSRATIO)
                                    y += DEFAULTCOMPRESSRATIO;
                    }       else y - DEFAULTCOMPRESSRATIO;
                    setObjectXY(object, x + ABSOLUTE_MIDDLE_X, ABSOLUTE_MIDDLE_Y - y);
            }
            return stateChanged;
}
/*=====================================================================
    * FUNCTION:               compress
    * DESCRIPTION:            Compress the sink, moving all objects radially
    *                         closer to it by the given amount.
    *                         If any gets close enough to the sink, it is "sucked in".
    * PARAMETERS:             sink number
    * RETURNS:                the number of objects whose sink state has changed,
    *                         i.e., who have just been sucked in the sink.
    *=====================================================================*/
int compress (int sinkNr) {
                    int length = countObjects (sinkNr);
                    int stateChanges = 0;
                    for (int i = 1; i <= length; i++) {
                            int object = getObjectInSink (sinkNr, i);
                            if (object) stateChanges += compressObject (object);
                    }
```

TABLE 1C-continued

```
                return stateChanges;
}
/*========================================================================
 * FUNCTION:             expand
 * DESCRIPTION:          Expand the sink, moving all objects radially
 *                       farther away from it by the given amount.
 *                       If necessary, release all those objects that were
 *                       previousiy "sucked in".
 * PARAMETERS:           sink number
 * RETURNS:              the number of objects whose sink state has changed,
 *                       i.e., who have just been thrown out of the sink.
 *========================================================================*/
int expand(int sinkNr) {
                int length = countObjects (sinkNr);
                int stateChanges = 0;
                for(int i = 1; i <= length; i++) {
                    int object = getObjectInSink (sinkNr, i);
                    if (object) stateChanges += expandObject (object);
                }
                return stateChanges;
}
/* Copyright © 1999 SUN Microsystems, Inc. All Rights Reserved */
```

What is claimed is:

1. A method for viewing a plurality of objects on a graphical display, the graphical display including a space for displaying objects, the method comprising:

receiving a command from a user;

if the command is a first command and an object is inside a sink containing objects that are not visible on the graphical display, moving the object a level deeper into the sink;

if the command is the first command and the object is located outside the sink on the graphical display, moving the object closer to a representation of the sink on the graphical display, the representation of the sink including an icon on the graphical display located at substantially the center of the graphical display;

wherein if the object moves within a proximity of the representation, the object leaves the graphical display and enters the sink;

wherein the icon visibly changes as more objects move into the sink;

if the command is a second command and the object is located inside the sink, moving the object a level higher in the sink;

wherein if the object is already at a highest level of the sink, the object leaves the sink and enters the graphical display at a location near the representation;

if the command is the second command and the object is located outside the sink on the graphical display, moving the object farther from the representation; and if the command is a find command, attempting to locate an object specified by the find command.

2. A method for viewing a plurality of objects on a graphical display, the graphical display including a space for displaying objects, the method comprising:

receiving a command from a user;

if the command is a first command and an object is located outside a sink containing objects that are not visible on the graphical display, moving the object closer to a representation of the sink on the graphical display;

wherein if the object moves within a proximity of the representation, the object leaves the graphical display and enters the sink; and if the command is a second command and the object is located outside the sink, moving the object farther from the representation of the sink.

3. The method of claim 2, further comprising if the command is the first command and the object is inside the sink, moving the object a level deeper into the sink.

4. The method of claim 2, further comprising if the command is the second command and the object is located inside the sink, moving the object a level higher in the sink;

wherein if the object is already at a highest level of the sink, the object leaves the sink and enters the graphical display at a location near the representation.

5. The method of claim 2, wherein the representation is a specific location on the graphical display.

6. The method of claim 2, wherein the representation includes an icon on the graphical display located at substantially the center of the graphical display.

7. The method of claim 6, wherein the icon visibly changes as more objects move into the sink.

8. The method of claim 6, wherein moving the object closer to the representation includes moving the object closer to the representation along a radial line between the object and the representation on the graphical display.

9. The method of claim 6, wherein the act of moving the object closer representation involves a forty five-degree diagonal movement toward the representation.

10. The method of claim 2, wherein the object includes a representation of a file in a computer system.

11. The method of claim 2, wherein the object includes a representation of a notepad for storing textual data.

12. The method of claim 2, wherein the object includes a second sink, such that if the object is selected, a representation of the second sink and an associated second space for displaying objects are displayed on the graphical display.

13. The method of claim 2, further comprising if the command is a find command, attempting to locate an object specified by the find command.

14. The method of claim 2, further comprising a representation of a second sink located on the graphical display.

15. The method of claim 2, wherein the command received from the user may additionally be an accelerated first command or an accelerated second command.

16. The method of claim 2, wherein the graphical display is located on one of, a personal organizer, a two-way pager, a cellular telephone and a mobile web browser.

17. A computer readable storage medium storing instructions that when executed by a computer cause the computer to perform a method for viewing a plurality of objects on a graphical display, the graphical display including space for displaying objects, the method comprising:

receiving a command from a user;

if the command is a first command and the object is located outside the sink, moving the object closer to a representation of the sink on the graphical display; wherein if the object moves within a proximity of the representation, the object leaves the graphical display and enters the sink;

wherein if the object is already at a highest level of the sink, the object leaves the sink and enters the graphical display at a location near the representation; and if the command is the second command and the object is located outside the sink, moving the object farther from the representation of the sink.

18. An apparatus for viewing a plurality of objects on a graphical display, comprising:

a processor;

the graphical display including a space for displaying objects;

a representation of a sink on the graphical display, the sink containing objects that are not visible on the graphical display;

an input device on the apparatus for receiving a command; and an object moving mechanism, that is configured to, move an object a level deeper into the sink if the command is a first command and the object is inside the sink, move the object closer to the representation of the sink on the graphical display if the command is the first command and the object is located outside the sink on the graphical display, wherein if the object moves within a proximity of the representation, the object leaves the graphical display and enters the sink;

move the object a level higher in the sink if the command is a second command and the object is located inside the sink, wherein if the object is already at a highest level of the sink, the object leaves the sink and enters the graphical display at a location near the representation, and move the object farther from the representation if the command is the second command and the object is located outside the sink on the graphical display.

19. The apparatus of claim 18, wherein the representation of the sink includes an icon on the graphical display located at substantially the center of the graphical display.

20. The apparatus of claim 19, wherein the icon visibly changes as more objects move into the sink.

21. The apparatus of claim 18, wherein the object moves closer to the representation along a radial line between the object and the representation.

22. The apparatus of claim 18, wherein the object moves closer to the representation using a forty five-degree diagonal movement toward the representation.

23. The apparatus of claim 16, further comprising an object locating mechanism that attempts to locate a desired object.

24. The apparatus of claim 18, wherein the graphical display is located on one of, a personal organizer, a two-way pager, a cellular telephone and a mobile web browser.

25. An apparatus for viewing a plurality of objects on a graphical display, comprising:

a means for receiving a command from a user;

a means for compressing objects that operates by, moving an object a level deeper into a sink containing objects that are not visible on the graphical display if the object is inside the sink;

moving the object closer to a representation of the sink on the graphical display if the object is located outside the sink on the graphical display, wherein if the object moves within a proximity of the representation, the object leaves the graphical display and enters the sink; and a means for expanding objects that operates by, moving the object a level higher in the sink if the object is located inside the sink; wherein if the object is already at a highest level of the sink, the object leaves the sink and enters the graphical display at a location near the representation, and moving the object farther from the representation if the object is located outside the sink on the graphical display.

\* \* \* \* \*